(12) United States Patent
Kosuge et al.

(10) Patent No.: US 6,372,326 B1
(45) Date of Patent: Apr. 16, 2002

(54) BIAXIALLY ORIENTED POLYESTER FILM TO BE MOLDED AND LAMINATED ON METAL SHEET

(75) Inventors: Masahiko Kosuge, Matsuyama; Hideshi Kurihara, Osaka, both of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/647,097

(22) PCT Filed: Apr. 12, 1999

(86) PCT No.: PCT/JP99/01930

§ 371 Date: Sep. 26, 2000

§ 102(e) Date: Sep. 26, 2000

(87) PCT Pub. No.: WO99/52969

PCT Pub. Date: Oct. 21, 1999

(30) Foreign Application Priority Data

Apr. 13, 1998 (JP) ............................................. 10-101319

(51) Int. Cl.⁷ ..................... B32B 15/08; B32B 27/06; B32B 27/20; B32B 27/36
(52) U.S. Cl. ..................... 428/141; 428/335; 428/323; 428/330; 428/331; 428/458; 428/480; 428/910; 428/304.4; 428/307.3; 528/302; 528/305; 528/308; 528/308.6
(58) Field of Search ................. 428/141, 334, 428/335, 323, 328, 329, 330, 331, 457, 458, 480, 910, 304.4, 307.3; 528/302, 305, 308, 308.6

(56) References Cited

U.S. PATENT DOCUMENTS

| 4,362,775 A | 12/1982 | Yabe et al. | |
|---|---|---|---|
| 4,590,119 A | 5/1986 | Kawakami et al. | 428/216 |
| 5,252,388 A | * 10/1993 | Murooka et al. | 428/328 |
| 5,318,833 A | * 6/1994 | Fujimoto et al. | 428/304.44 |
| 5,368,932 A | * 11/1994 | Murooka et al. | 428/327 |

FOREIGN PATENT DOCUMENTS

| EP | 0 712 720 A3 | 5/1996 |
|---|---|---|
| JP | 55-23136 | 2/1980 |
| JP | 56-10451 | 2/1981 |
| JP | 64-22530 | 1/1989 |
| JP | 1-161025 | 6/1989 |
| JP | 1-192545 | 8/1989 |
| JP | 1-192546 | 8/1989 |
| JP | 2-57339 | 2/1990 |
| JP | 4-173227 | 6/1992 |
| JP | 4-298539 | 10/1992 |
| JP | 5-170942 | 7/1993 |
| JP | 5-339348 | 12/1993 |
| JP | 6-39979 | 2/1994 |
| JP | 6-80796 | 3/1994 |
| JP | 6-80797 | 3/1994 |
| JP | 6-116376 | 4/1994 |
| JP | 7-70340 | 3/1995 |
| JP | 8-269215 | 10/1996 |
| JP | 9-277471 | 10/1997 |
| JP | 9-277476 | 10/1997 |
| JP | 10-87798 | 4/1998 |
| WO | WO97/45483 | 12/1997 |
| WO | WO98/12049 | 3/1998 |
| WO | WO98/14328 | 4/1998 |

OTHER PUBLICATIONS

XP002163693, JP 06 116376, Derwent Publications Ltd., Apr. 1994, abstract.
XP002163694, JP 07 207040, Derwent Publications Ltd., Aug. 1995, abstract.
XP002163695, JP 06 116486, Derwent Publications Ltd., Apr. 1994, abstract.

* cited by examiner

*Primary Examiner*—Vivian Chen
(74) *Attorney, Agent, or Firm*—Sughrue Mion, PLLC

(57) ABSTRACT

A biaxially oriented polyester film to be molded and laminated with a metal sheet which shows excellent moldability when it is laminated with a metal sheet and subjected to a can making process such as drawing and from which a metal can such as a drink can or food can having excellent heat resistance, retort resistance, taste and odor retention properties, impact resistance and corrosion preventing properties can be produced. This polyester film is produced from a copolyester which contains porous particles having an average particle diameter of 0.1 to 2.5 μm, a pore volume of 0.05 to 2.5 ml/g, a specific surface area of 50 to 600 m²/g and a compressive resistance of 1 to 100 MPa and has a glass transition temperature of 70° C. or higher and lower than 78° C., a melting point of 210 to 250° C. and an intrinsic viscosity of 0.50 to 0.80 dl/g.

20 Claims, No Drawings

BIAXIALLY ORIENTED POLYESTER FILM TO BE MOLDED AND LAMINATED ON METAL SHEET

FIELD OF THE INVENTION

The present invention relates to a biaxially oriented polyester film to be molded and laminated on a metal sheet. More specifically, it relates to a biaxially oriented polyester film to be molded and laminated on a metal sheet, which exhibits excellent moldability when it is laminated on a metal sheet and subjected to a can making process such as drawing and from which metal cans having excellent heat resistance, retort resistance, taste and odor retention properties, impact resistance and corrosion prevention properties, such as drink cans and food cans, can be produced.

PRIOR ART

Metal cans are generally coated on interior and exterior surfaces to prevent corrosion. Recently, the development of methods for obtaining corrosion prevention properties without using an organic solvent has been promoted to simplify production process, improve sanitation and prevent pollution. One of the methods is to coat a metal can with a thermoplastic resin film. That is, studies on a method for making cans by laminating a thermoplastic resin film on a sheet of a metal such as tin, tinfree steel or aluminum and drawing the laminated metal sheet are under way. A polyolefin film or polyamide film has been tried as this thermoplastic resin film but does not satisfy all requirements such as moldability, heat resistance, impact resistance, and taste and odor retention properties.

Then, a polyester film, particularly a polyethylene terephthalate film attracts much attention as a film having well-balanced properties and there have been made some proposals based on this film (JP-A 56-10451, JP-A 64-22530, JP-A 1-192545, JP-A 1-192546 and JP-A 2-57339) (the term "JP-A" as used herein means an "unexamined published Japanese patent application"). However, studies conducted by the present inventors have revealed that, in the case of molding which is accompanied by large deformation, moldability, retort resistance, and taste and odor retention properties become unsatisfactory.

A copolyester film has been studied as a film which is satisfactory in terms of moldability, heat resistance, impact resistance, and taste and odor retention properties. JP-A 5-339348 discloses a polyester film to be molded and laminated on a metal sheet, which comprises a copolyester having a specific melting point, glass transition temperature and terminal carboxyl group concentration. JP-A 6-39979 proposes a polyester film to be molded and laminated on a metal sheet, on which a copolyester having a specific melting point and glass transition temperature is laminated. However, studies conducted by the present inventors have revealed that when cans covered with these films are used as drink containers, a change in odor or taste is detected according to the type of a drink as disclosed by JP-A 55-23136.

JP-A 6-116376 proposes a polyester film to be molded and laminated on a metal sheet, which is made from a copolyester containing specific amounts of elemental alkali metals and elemental germanium. When this film is used, it exhibits excellent taste and odor retention properties in a system in which it is not heated while containing contents, such as a cold pack system, but does not always obtain sufficient taste and odor retention properties in a system in which it is heated while containing contents, such as a retort treatment.

JP-A 7-70340 proposes a copolyester film containing lubricant particles having an average particle diameter of 1.0 $\mu$m or less and specifying the density of agglomerates of the particles in the film as a material having pinhole resistance. JP-A 8-269215 proposes a polyester film which specifies the degree of deformation of particles contained in the film as a material having pinhole resistance. When a metal sheet is deformed more than usual, sufficient can making properties cannot be obtained from the films because the particles may fall off from these films, taste and odor retention properties may deteriorate and the heat resistance of the particles may lower.

It is an object of the present invention to provide a biaxially oriented polyester film to be molded and laminated on a metal sheet, which eliminates the defects of the prior art and has improved pinhole resistance and deep drawability while retaining excellent heat resistance, impact resistance, taste and odor retention properties, and corrosion prevention properties of a copolyester film.

It is another object of the present invention to provide an industrially advantageous process for producing a polyester as a raw material for the biaxially oriented polyester film of the present invention.

Other objects and advantages of the present invention will become apparent from the following description.

According to the present invention, the above objects and advantages of the present invention are attained by a biaxially oriented polyester film to be molded and laminated on a metal sheet, (A) which comprises a copolyester comprising (a) terephthalic acid and isophthalic acid as dicarboxylic acid components, terephthalic acid being contained in an amount of 82 mol % or more and isophthalic acid or a combination of isophthalic acid and other dicarboxylic acid being contained in an amount of 18 mol % or less based on the total of all the dicarboxylic acid components, and (b) ethylene glycol in an amount of 82 to 100 mol % and other diol in an amount of 0 to 18 mol % based on the total of all the diol components as diol components, having (c) a glass transition temperature of 70° C. or higher and lower than 78° C., (d) a melting point of 210 to 250° C., (e) an intrinsic viscosity of 0.50 to 0.80 dl/g, and containing (f) porous particles having an average particle diameter of 0.1 to 2.5 $\mu$m, a pore volume of 0.05 to 2.5 ml/g, a specific surface area of 50 to 600 m$^2$/g and a compressive resistance of 1 to 100 MPa, and;

(B) which contains agglomerates of the porous particles having a particle diameter of 20 $\mu$m or more at a density of no more than 10/mm$^2$.

The copolyester used in the present invention consists of terephthalic acid and isophthalic acid as dicarboxylic acid components, and terephthalic aid is contained in an amount of 82 mol % or more and isophthalic acid or a combination of isophthalic acid and other dicarboxylic acid is contained in an amount of 18 mol % or less based on the total of all the dicarboxylic acid components as specified in (a). Illustrative examples of the other dicarboxylic acid other than terephthalic acid and isophthalic acid include aromatic dicarboxylic acids such as 2,6-naphthalenedicarboxylic acid and phthalic acid; aliphatic dicarboxylic acids such as adipic acid, azelaic acid, sebacic acid and decanedicarboxylic acid; and alicyclic dicarboxylic acids such as cyclohexanedicarboxylic acid. They may be used alone or in combination of two or more. Out of these, 2,6-naphthalenedicarboxylic acid is preferred from the viewpoints of flavor retention properties and impact resistance.

As specified in (b), the copolyester comprises ethylene glycol in an amount of 82 to 100 mol % and other diol in an amount of 0 to 18 mol % based on the total of all the diol components. Illustrative examples of the other diol include aliphatic diols such as diethylene glycol, propylene glycol, neopentyl glycol, butanediol, pentanediol and hexanediol; alicyclic diols such as cylohexane dimethanol; aromatic diols such as bisphenol A; and polyalkylene glycols such as polyethylene glycol and polypropylene glycol. They may be used alone or in combination of two or more. Out of these, triethylene glycol, cyclohexane dimethanol, neopentyl glycol and diethylene glycol are preferred from the viewpoints of flavor retention properties and moldability.

When one of these ethylene glycols is contained as the main glycol component, diethylene glycol is preferably copolymerized, more preferably copolymerized in an amount of 5 mol % or less, particularly preferably 4 mol % or less based on the total of all the glycol. When the amount of diethylene glycol is larger than 5 mol %, heat resistance may lower. This diethylene glycol component includes a diethylene glycol component by-produced when an aromatic copolyester comprising ethylene glycol as a glycol component is produced.

The copolyester of the present invention is preferably a copolyester which comprises terephthalic acid and isophthalic acid as the only dicarboxylic acid components and ethylene glycol as the only diol component.

The copolyester of the present invention has a glass transition temperature (Tg) of 70° C. or higher and lower than 78° C. and a melting point of 210 to 250° C. as specified in (c) and (d). When Tg is lower than 70° C., heat resistance deteriorates, thereby worsening taste and odor retention properties after the retort treatment of a film.

Tg of a film is measured by a method for obtaining a glass transition point with the Du Pont Instruments 910 DSC at a temperature elevation rate of 20° C./min by placing 20 mg of a sample in a DSC measurement pan, heating and melting the sample on a heating stage at 290° C. for 5 minutes and quenching to solidify the sample containing pan on an aluminum foil placed on ice.

When the melting point is lower than 210° C., the heat resistance of the film deteriorates disadvantageously and when the melting point is higher than 250° C., the crystallinity of the film becomes high, thereby impairing the moldability of the film disadvantageously. The melting point is preferably in the range of 215 to 245° C.

The melting point of the film is measured by a method for obtaining a melting peak with the Du Pont Instruments 910 DSC at a temperature elevation rate of 20° C./min. The amount of the sample is 20 mg.

The copolyester of the present invention has an intrinsic viscosity (o-chlorophenol, 35° C.) of 0.50 to 0.80 dl/g as specified in (e). When the intrinsic viscosity is lower than 0.50, the impact resistance of the film becomes insufficient disadvantageously and when the intrinsic viscosity is higher than 0.80, the intrinsic viscosity of a raw material polymer must be increased excessively which is economically disadvantageous. It is preferably 0.55 to 0.75, more preferably 0.60 to 0.70.

Preferably, the copolyester of the present invention has a terminal carboxyl group concentration of 40 eq./$10^6$ g or less and an aldehyde content of 15 ppm or less.

Preferably, the copolyester of the present invention contains alkali metal compounds in a total amount of 5 ppm or less in terms of elemental alkali metals from the viewpoint of taste and odor retention properties. The total amount of elemental alkali metals is the total amount (ppm) of elemental Li, Na and K determined by atomic absorption spectrophotometry.

A catalyst used in the polymerization reaction of the copolyester is not limited to a particular kind but preferably an antimony compound (Sb compound), titanium compound (Ti compound) or germanium compound (Ge compound). Out of these, a germanium compound is particularly preferred from the viewpoint of the taste and odor retention properties of the obtained film.

Preferred examples of the antimony compound include antimony trioxide, antimony acetate and the like. Preferred examples of the titanium compound include titanium tetrabutoxide, titanium acetate and the like. Preferred examples of the germanium compound include amorphous germanium oxide, fine crystalline germanium oxide, a solution prepared by dissolving germanium oxide in a glycol in the presence of an alkali metal, alkali earth metal or a compound thereof, a solution prepared by dissolving germanium oxide in water, and the like.

The process for producing the copolyester of the present invention is not particularly limited. The copolyester of the present invention is produced in the presence of a metal compound as a catalyst and a phosphorus compound as a stabilizer and satisfies the following expressions (1) and (2):

$$20 \leq M+P \leq 55 \tag{1}$$

$$1 \leq M/P \leq 5 \tag{2}$$

wherein M is the concentration (mmol %) of a metal element contained in the copolyester and P is the concentration (mmol %) of phosphorus element contained in the copolyester.

When (M+P) is smaller than 20 mmol %, the copolyester productivity of an electrostatic casting method lowers. When (M+P) is larger than 55 mmol %, the amount of an ether glycol by-produced may increase, thereby reducing heat resistance. When M/P is smaller than 1 or larger than 5, the ratio of the metal element of the catalyst and phosphorus element may get out of balance and an excess of phosphorus element or the metal element of the catalyst may be contained in the polymer, thereby reducing thermal stability.

Further, the metal element (M) of the catalyst is preferably in the range of 10 to 35 mmol %. When M is smaller than 10 mmol %, it is difficult to obtain a copolyester having a sufficient degree of polymerization and characteristic properties such as impact resistance may lower. When M is larger than 35 mmol %, the thermal stability of the obtained copolyester may lower.

The above copolyester of the present invention further contains porous particles having an average particle diameter of 0.1 to 2.5 μm, a pore volume of 0.05 to 2.5 ml/g, a specific surface area of 50 to 600 m$^2$/g and a compressive resistance of 1 to 100 MPa as specified in (f). The average particle diameter is preferably 0.1 to 1.5 μm, more preferably 0.3 to 1.0 μm.

When the average particle diameter is larger than 2.5 μm, pinholes are easily formed at the time of molding disadvantageously.

The average particle diameter of the porous particles is a value at an integral 50% point in an equivalent sphere diameter distribution obtained by a centrifugal sedimentation particle size distribution measuring instrument.

The pore volume of each of the porous particles is 0.05 to 2.5 ml/g as described above, preferably 0.1 to 2.0 ml/g, more preferably 0.5 to 1.8 ml/g. When the pore volume of the porous particle is smaller than 0.05 ml/g, the affinity of the porous particle for the film lowers, thereby causing the breakage of the film at the time of molding. When it is larger than 2.5 ml/g, the porous particles are reduced in size at the time of molding and some of the particles are easily contained in a drink, thereby reducing taste and odor retention properties disadvantageously.

The pore volume of the porous particle is measured by a mercury-helium method.

The specific surface area of the porous particle is 50 to 600 m$^2$/g as described above, preferably 150 to 450 m$^2$/g.

The compressive resistance of the porous particle used in the present invention is 1 to 100 MPa, more preferably 5 to 50 MPa. When the compressive resistance is larger than 100 MPa, the porous particle itself chips the film at the time of molding, thereby reducing impact resistance and corrosion preventing properties.

The compressive resistance is defined as follows. Load is applied to the porous particle by a micro compression tester while the particle is observed through a microscope to obtain a load at break, this operation is made on at least 100 porous particles, and the mean value of measurement data on the 100 particles is taken as compressive resistance.

The content of the porous particles used in the present invention is preferably 0.05 to 5.0 wt %, more preferably 0.08 to 3.0 wt %, much more preferably 0.1 to 1.0 wt %. When the content is smaller than 0.05 wt %, film winding properties become unsatisfactory, thereby reducing productivity and when the content is larger than 5.0 wt %, pinholes are easily formed in the film at the time of molding disadvantageously.

The porous particles used in the present invention are inorganic particles such as colloidal silica, porous silica, titanium oxide, calcium carbonate, calcium phosphate, barium sulfate, alumina, zirconia, kaolin or composite oxide particles; or organic particles such as crosslinked polystyrene, acrylic crosslinked particles, methacrylic crosslinked particles or slicone particles. The porous particles are not limited to the above externally added particles and may be internally precipitated particles obtained by precipitating part or all of the catalyst used in the production of a copolyester in a reaction step. Externally added particles and internally precipitated particles may be used in combination. Out of these, porous silica having a large specific surface area is particularly preferred from the viewpoint of moldability.

The porous particles have hydroxyl groups on the surface in an amount of preferably 300 KOHmg/g or less, more preferably 200 KOHmg/g or less in terms of hydroxyl value.

The copolyester of the present invention may further contain inert globular particles which have a particle diameter ratio (long diameter/short diameter) of 1.0 to 1.2 and an average particle diameter of 2.5 μm or less and do not substantially agglomerate, in addition to the above porous particles. Illustrative examples of the inert globular particle lubricant include inorganic lubricants such as silica, alumina, titanium oxide, calcium carbonate and barium sulfate; and organic lubricants such as silicone resin particles and crosslinked polystyrene particles. Out of these, spherical silica, spherical silicone resin particles and globular crosslinked polystyrene are particularly preferred.

Preferably, these globular lubricants have an average particle diameter of 0.05 to 0.8 μm which is smaller than the average particle diameter of the porous particles. The content thereof is preferably 0.01 to 1 wt %.

The copolyester of the present invention can be advantageously produced by esterifying terephthalic acid and isophthalic acid and optionally other dicarboxylic acid as dicarboxylic acid components and ethylene glycol and optionally other diol as diol components; and adding porous particles having an average particle diameter of 0.1 to 2.5 μm, a pore volume of 0.05 to 2.5 ml/g, a specific surface area of 50 to 600 m$^2$/g and a compressive resistance of 1 to 100 MPa to a polycondensation reaction system after the terminal carboxyl group concentration of the obtained polycondensate becomes 100 eq./10$^6$ g or less.

By adding the porous particles after the terminal carboxyl group concentration of the copolyester (precursor) becomes 100 eq./106 g or less, the agglomeration of the porous particles into coarse particles can be suppressed and the porous particles can be well dispersed.

The terminal carboxyl group concentration can be obtained by an A. Conix method (Markromol. Chem. 26, 226 (1958)).

The copolyester obtained by the above method (melt polymerization) may be converted into a polymer having a higher degree of polymerization by a polymerization method (solid-phase polymerization) in a solid phase as required.

The copolyester may contain optional additives such as an antioxidant, thermal stabilizer, viscosity modifier, plasticizer, color modifier, nucleating agent and ultraviolet light absorber.

The polyester film of the present invention is a biaxially oriented film obtained by biaxial orientation and optionally heat setting.

The biaxially oriented polyester film of the present invention contains coarse particles having a particle diameter of 20 μm or more at a density of no more than 10/mm$^2$. The coarse particles are specified as the agglomerates of the above porous particles. When the density of the coarse particles having a particle diameter of 20 μm or more is higher than 10/mm$^2$, pinholes are formed at the time of molding.

The refractive index in a thickness direction of the polyester film of the present invention is preferably 1.500 to 1.540, more preferably 1.505 to 1.530. When the refractive index is too low, moldability becomes unsatisfactory and when the refractive index is too high, the film becomes almost amorphous, whereby heat resistance may lower.

The center line average roughness (Ra) on the film plane of the polyester film of the present invention is preferably 30 nm or less, more preferably 25 nm or less, particularly preferably 20 nm or less.

The polyester film of the present invention has a thickness of preferably 6 to 75 μm, more preferably 8 to 75 μm, particularly preferably 10 to 50 μm. When the thickness is smaller than 6 μm, the film is easily broken at the time of molding and when the thickness is larger than 75 μm, the quality of the film becomes excessively high, which is economically disadvantageous.

The metal sheet to be laminated with the polyester film of the present invention, particularly a metal sheet for can making, is advantageously a sheet of tin, tin-free steel, aluminum or the like. The polyester film can be laminated on the metal sheet by the following methods.

(1) The metal sheet is heated at a temperature higher than the melting point of the film, laminated with the film and cooled to make a surface layer portion (thin layer portion) of the film bonding to the metal sheet amorphous to contact with the metal sheet.

(2) A primer is coated on the film to form an adhesive layer and the film is laminated on the metal sheet in such a manner that the adhesive layer is in contact with the metal sheet. Known resin adhesives such as epoxy adhesives, epoxy-ester adhesives and alkyd adhesives may be used to form the adhesive layer.

A laminate produced by laminating the polyester film of the present invention with a metal sheet as described above can be advantageously used for the production of a metal can having the polyester film on the interior side by deep drawing.

EXAMPLES

The following examples are given to further illustrate the present invention. The characteristic properties of the film were measured in accordance with the following methods and evaluated.

(1) Intrinsic Viscosity ([η]) of Polyester

Measured in orthochlorophenol at 35° C.

(2) Melting Point (Tm) of Polyester

A melting peak is obtained at a temperature elevation rate of 20° C./min using the Du Pont Instruments 910 DSC. The amount of a sample is 20 mg.

(3) Glass Transition Temperature (Tg) of Polyester 20 mg of a film sample is placed in a DSC measurement pan and molten by heating on a stage at 290° C. for 5 minutes, the sample pan is quench solidified on an aluminum foil laid on ice, and a glass transition point is obtained at a temperature elevation rate of 20° C./min using the Du Pont Instruments 910 DSC.

(4) Amount of Acetaldehyde (ppm)

The amount of acetaldehyde generated when the film is heated at 160° C. for 20 minutes is determined by gas chromatography.

(5) Concentration of Terminal Carboxyl Group (Equivalent/$10^6$ g)

Measured in accordance with an A. Conix method (Makromal. Chem. 26, 226 (1958)).

(6) Average Particle Diameter of Lubricant

The diameter at an integrate volume fraction of 50% in an equivalent sphere diameter distribution measured by a centrifugal sedimentation particle size distribution measuring instrument is taken as average particle diameter.

(7) Pore Volume

The pore volume of a powder is obtained from the amount of nitrogen absorbed at a relative pressure of 0.998 measured by a constant nitrogen absorption volume method using the Autosoap-1 of Cantachrome Co., Ltd. based on the condition that all the pores of the powder are filled with nitrogen.

(8) Specific Surface Area

The amount of nitrogen adsorbed at a relative pressure of 0.3 is obtained by a constant nitrogen absorption volume method using the Autosoap-1 of Cantachrome Co., Ltd. like the pore volume to calculate the specific surface area of a powder in accordance with a BET one-point method. The term "specific surface area" as usedherein means the total surface area per unit weight of a powder.

(9) Compressive Resistance

Load (load between 0.01 to 0.2 g: loading rate of 3 mg/sec., between 0.2 to 2 g: 29 mg/sec., between 2 to 20 g: 270 mg/sec, between 20 to 200 g: 1,440 mg/sec.) is applied to a particle at a fixed rate according to the set load using the MCTM-201 micro-compression tester of Shimadzu Corporation while observing the particle through a microscope and load at break is taken as compressive resistance. This operation is carried out on at least 100 particles and the mean value of measurement data is taken as average compressive resistance.

(10) Hydroxyl Value of Lubricant

Hydroxyl groups contained in the lubricant powders are acetylated with acetic anhydride and a predetermined amount of di-n-butylamine is added to acetylate an excess of acetic anhydride. The remaining di-n-butylamine is titrated with HCl to obtain the amount of acetic anhydride consumed with hydroxyl groups so as to calculate the hydroxyl value from the following equation (reference document J. Pharm, Sci., 66, 273 (1997)).

$$\text{hydroxyl value (KOH mg/g)} = (A-B) \times F/S$$

A: amount of N/2 HCl solution of run proper (ml)
B: amount of N/2 HCl solution of blank run (ml)
C: strength of N/2 HCl solution (KOH mg/ml)
S: amount of sample (g)

(11) Amounts of Alkali Metals

After a film sample is dissolved in o-chlorophenol, an extraction operation is carried out with 0.5 N hydrochloric acid. The amounts of Na, K and Li contained in this extract are determined by the Z-6100 Polarization Zeeman atomic absorption spectrophotometer of Hitachi, Ltd.

(12) Amounts of Metal Element of Catalyst and Phosphorus Element

A film sample is molten by heating at 240° C. to prepare a round disk and the amounts of the metal element of a catalyst and phosphorus element are determined by the Model 3270 fluorescent X-ray apparatus of Rigaku Co., Ltd.

(13) Measurement of Coarse Particles

The surface of a film is etched to observe a 1 mm$^2$ area through the S-2150 transmission electron microscope of Hitachi Ltd. to count particles having a maximum length of 20 μm or more from an image of particles (per mm$^2$).

(14) Amount of Diethylene Glycol

A film is dissolved in a mixed solvent of $CDCl_3$ and $CF_3COOD$ to measure the amount of diethylene glycol with $^1$H-NMR.

(15) Film Surface Roughness (Ra)

The surface roughness of a film is measured at a tracer radius of 2 μm, a measurement pressure of 0.03 g and a cut-off value of 0.25 mm with the tracer surface roughness meter (SURFCORDER SE-30C) of Kosaka Kenkyusho Co., Ltd.

(16) Lamination Properties

A film is laminated on a 0.25 mm-thick tin-free steel sheet heated at a temperature higher than the melting point of a copolyester and cooled to obtain a laminated steel sheet. This laminated steel sheet is observed and evaluated for its lamination properties based on the following criteria.

[Criteria for Bubbles and Wrinkles (Lamination Property A)]
○: No bubbles and no wrinkles are observed.
Δ: A few bubbles or wrinkles are observed per 10 cm.
X: Many bubbles and wrinkles are observed.

[Criteria for Heat Shrinkage (Lamination Property B)]
○: shrinkage factor of less than 2%
Δ: shrinkage factor of 2% or more and less than 5%
X: shrinkage factor of 5% or more

(17) Deep Drawability-1

A tin-free steel sheet laminated with a film in the same manner as in (16) above is cut into a150 mm-diameter disk-like piece. The disk-like piece is deep drawn using a drawing dice and punch in four stages to form a 55 mm-diameter container without a seam joint on the side (to be called "can" hereinafter). This can is observed for the following items and evaluated based on the following criteria.

○: The film is not abnormal and the molded film is not whitened or broken.
Δ: A top portion of the film of the can is whitened.
X: Part of the film is broken.

(18) Deep Drawability-2

The can obtained in (17) above is observed and tested and evaluated based on the following criteria.

○: The film is molded properly and exhibits a current value of 0.2 mA or less in a corrosion prevention test on the film on the interior surface of the can. (The current value is measured when the can is filled with a 1% NaCl aqueous solution, an electrode is inserted into the can, and a voltage of 6V is applied with the can as an anode. This test is referred to as "ERV test" hereinafter.)

X: The film is not abnormal but exhibits a current value of more than 0.2 mA in the ERV test. When an energized portion of the film is magnified for observation, a pinhole-like crack which is started from the coarse lubricant of the film is observed.

(19) Impact Resistance

Well deeply drawn cans are filled with water, cooled to 0° C., and dropped onto a vinyl chloride tiled floor from a height of 30 cm in groups of 10 for each test. Thereafter, an ERV test is made on the cans which are then evaluated based on the following criteria.

○: The films of all the 10 cans exhibit a current value of 0.2 mA or less.

Δ: The films of 1 to 5 cans exhibit a current value of more than 0.2 mA.

X: The films of 6 or more cans exhibit a current value of more than 0.2 mA, or the film is cracked after dropping.

(20) Resistance to Heat Embrittlement

Well deeply drawn cans are heated at 200° C. for 5 minutes to be maintained, and evaluated for impact resistance described in (19) above based on the following criteria.

○: The films of all the 10 cans exhibit a current value of 0.2 mA or less.

Δ: The films of 1 to 5 cans exhibit a current value of more than 0.2 mA.

X: The films of 6 or more cans exhibit a current value of more than 0.2 mA, or the film is cracked after being heated at 200° C. for 5 minutes.

(21) Retort Resistance

Well deeply drawn cans are filled with water, subjected to a retort treatment at 120° C. for 1 hour using a steam sterilizer and kept at 50° C. for 30 days. The cans are then dropped onto a vinyl chloride tiled floor from a height of 50 cm in groups of 10 for each test and an ERV test is made on the inside of each can to evaluate based on the following criteria.

○: The films of all the 10 cans exhibit a current value of 0.2 mA or less.

Δ: The films of 1 to 5 cans exhibit a current value of more than 0.2 mA.

X: The films of 6 or more cans exhibit a current value of more than 0.2 mA, or the film is cracked after dropping.

(22) Taste and Odor Retention Property-1

Well deeply drawn cans are filled with ion exchange water and kept at normal temperature (20° C.) for 30 days. A drink test is made on 30 panelists using the ion exchange water to be compared with ion exchange water as reference. The taste and odor retention properties of the film are evaluated based on the following criteria.

⊚: 3 or less out of 30 panelists feel changes in taste and odor compared with the reference solution.

○: 4 to 6 out of 30 panelists feel changes in taste and odor compared with the reference solution.

Δ: 7 to 9 out of 30 panelists feel changes in taste and odor compared with the reference solution.

X: 10 or more out of 30 panelists feel changes in taste and odor compared with the reference solution.

(23) Taste and Odor Retention Property-2

Well deeply drawn cans are filled with ion exchange water, subjected to a retort treatment in a steam sterilizer at 125° C. for 1 hour and kept at normal temperature (20° C.) for 30 days. A drink test is made on 30 panelists using the ion exchange water to be compared with ion exchange water as reference. The taste and odor retention properties of the film are evaluated based on the following criteria.

⊚: 3 or less out of 30 panelists feel changes in taste and odor compared with the reference solution.

○: 4 to 6 out of 30 panelists feel changes in taste and odor compared with the reference solution.

Δ: 7 to 9 out of 30 panelists feel changes in taste and odor compared with the reference solution.

X: 10 or more out of 30 panelists feel changes in taste and odor compared with the reference solution.

Examples 1 to 4 and Comparative Examples 1 and 2

A co-PET (containing 0.1 wt % of porous silica particles having an average particle diameter of 0.7 μm, a pore volume of 1.5 ml/g, a specific surface area of 200 m$^2$/g and a compressive resistance of 20 MPa) obtained using acid components, DEG and polycondensation catalyst shown in Table 1 was dried, melt extruded at 280° C., and quench solidified to give an unstretched film. Thereafter, this unstretched film was stretched to 3.0 times in a longitudinal direction at 110° C. and to 3.0 times in a transverse direction at 120° C., and heat set at 180° C. to give a biaxially oriented film.

The obtained film had a thickness of 25 μm, a surface roughness of 15 nm and agglomerated particles of porous silica having a particle diameter of 20 μm or more contained therein at a density of 2/mm$^2$. Other characteristic properties are shown in Table 1 and evaluation results are shown in Table 2.

As is obvious from Table 2, in the case of the present invention (Examples 1 to 4) in which terephthalic acid was contained in an amount of 82 mol % or more and isophthalic acid or a combination of isophthalic acid and other dicarboxylic acid was contained in an amount of 18 mol % or less based on the total of all the dicarboxylic acid components in the copolyester, good results were obtained. However, when the amount of isophthalic acid was 18 mol % or more (Comparative Example 1), the obtained film was inferior in heat resistance and odor retention properties. When the melting point was higher than 250° C. (Comparative Example 2), the obtained film was unsatisfactory in terms of moldability.

TABLE 1

| | dicarboxylic acid components (molar ratio) | | DEG component | polycondensation | | Tg | Tm | COOH | AA | film refractive |
|---|---|---|---|---|---|---|---|---|---|---|
| | A | B | (mol %) | catalyst | IV | (°C.) | (°C.) | (eq/T) | (ppm) | index |
| C. Ex. 1 | TA(80) | IA(20) | 1.5 | $GeO_2$ | 0.70 | 70 | 208 | 30 | 10 | 1.520 |
| Ex. 1 | TA(85) | IA(15) | 1.5 | $GeO_2$ | 0.70 | 72 | 220 | 30 | 10 | 1.520 |
| Ex. 2 | TA(91) | IA(9) | 1.5 | $GeO_2$ | 0.70 | 74 | 236 | 30 | 10 | 1.520 |
| C. Ex. 2 | TA(99) | IA(1) | 1.5 | $GeO_2$ | 0.70 | 77 | 255 | 30 | 10 | 1.520 |
| Ex. 3 | TA(88) | IA(12) | 1.5 | $GeO_2$ | 0.70 | 73 | 228 | 30 | 10 | 1.520 |
| Ex. 4 | TA(88) | IA(9) NDC(3) | 1.5 | $GeO_2$ | 0.70 | 76 | 228 | 30 | 10 | 1.522 |

C. Ex.: Comparative Example
Ex.: Example
*dicarboxylic acid components
TA: terephthalic acid
IA: isophthalic acid
NDC: 2,6-naphthalenedicarboxylic acid
*DEG: diethylene glycol
*$GeO_2$: germanium dioxide
*IV: intrinsic viscosity
*Tg: glass transition temperature
*Tm: melting point
*COOH: concentration of carboxyl terminal groups
*AA: content of acetaldehyde

TABLE 2

| | lamination properties | | deep drawability | | impact resistance | resistance to heat embrittlement | retort resistance | taste and odor retention properties | |
|---|---|---|---|---|---|---|---|---|---|
| | (A) | (B) | 1 | 2 | | | | 1 | 2 |
| C. Ex. 1 | ○ | ○ | ○ | ○ | ○ | Δ | X | ○ | Δ |
| Ex. 1 | ○ | ○ | ○ | ○ | ○ | ○ | ○ | ⊙ | ○ |
| Ex. 2 | ○ | ○ | ○ | ○ | ○ | ○ | ○ | ⊙ | ○ |
| C. Ex. 2 | ○ | Δ | Δ | X | — | — | — | — | — |
| Ex. 3 | ○ | ○ | ○ | ○ | ○ | ○ | ○ | ⊙ | ○ |
| Ex. 4 | ○ | ○ | ○ | ○ | ○ | ○ | ○ | ⊙ | ○ |

C. Ex.: Comparative Example
Ex.: Example

Examples 5 to 8 and Comparative Examples 3 to 7

A biaxially oriented polyester film was obtained in the same manner as in Example 3 except that the average particle diameter, pore volume, specific surface area and compressive resistance of the porous silica lubricant were changed as shown in Table 3.

The results are as shown in Table 4. In the case of the present invention (Examples 5 to 8) in which the porous silica had an average particle diameter of 0.1 to 2.5 μm, a pore volume of 0.05 to 2.5 ml/g, a specific surface area of 50 to 600 m²/g and a compressive resistance of 1 to 100 MPa, good results were obtained. On the other hand, when the average particle diameter was larger than 2.5 μm (Comparative Example 3), the pore volume was larger than 2.5 ml/g (Comparative Example 4), and the specific surface area was larger than 600 m²/g (Comparative Example 6), agglomerates of the porous silica lubricant became large after addition for the production of the copolyester and the formation of pinholes frequently occurred at the time of molding, thereby deteriorating moldability and odor retention properties. When the lubricant was changed from the porous silica to colloidal silica having a specific surface area of less than 50 m²/g and a compressive resistance of more than 100 MPa (Comparative Example 5) and when the lubricant was changed to alumina silica having a specific surface area of less than 50 m²/g and a pore volume of less than 0.05 ml/g (Comparative Example 7), the lubricant fell off at the time of high-level molding and impact resistance and odor retention properties became unsatisfactory.

Example 9

A copolyester was polymerized and a biaxially oriented polyester film was obtained in the same manner as in Example 5 except that a so-called direct polymerization process was employed as a process for producing a copolyester in Example 5, 88 parts of terephthalic acid and 12 parts of isophthalic acid were used as dicarboxylic acid components, 56 parts of ethylene glycol was used as a glycol component, an esterification reaction was promoted to the full, and porous silica shown in Table 4 was added when the concentration of terminal carboxyl groups reached 80 eq/T. The results are shown in Table 3 and Table 4. Even when the direct polymerization process was employed, the agglomeration of the porous silica was suppressed and good results were obtained.

TABLE 3

|  | Tg (° C.) | type of lubricant | average particle diameter (μm) | pore volume (ml/g) | specific surface area (m²/g) | compressive resistance (MPa) | hydroxyl value (KOH · mg/g) | number of coarse particles (per/mm²) |
|---|---|---|---|---|---|---|---|---|
| C. Ex. 3 | 73 | porous silica | 5.0 | 1.5 | 200 | 20 | 100 | 15 |
| Ex. 5 | 73 | porous silica | 2.0 | 1.5 | 200 | 20 | 150 | 3 |
| Ex. 6 | 73 | porous silica | 0.7 | 0.5 | 200 | 80 | 180 | 5 |
| Ex. 7 | 73 | porous silica | 0.7 | 2.0 | 200 | 20 | 180 | 5 |
| Ex. 8 | 73 | porous silica | 0.5 | 1.5 | 400 | 20 | 200 | 7 |
| C. Ex. 4 | 73 | porous silica | 0.7 | 3.0 | 200 | 20 | 180 | 12 |
| C. Ex. 5 | 73 | colloidal silica | 0.5 | 0.07 | 10 | 350 | 1 | 0 |
| C. Ex. 6 | 73 | porous silica | 0.2 | 1.5 | 800 | 20 | 300 | 20 |
| C. Ex. 7 | 73 | alumina silicate | 0.5 | 0.01 | 10 | 100 | 10 | 5 |
| Ex. 9 | 73 | porous silica | 0.7 | 1.5 | 200 | 20 | 150 | 7 |

C. Ex.: Comparative Example
Ex.: Example

TABLE 4

|  | lamination properties | | deep drawability | | impact resistance | resistance to heat embrittlement | retort resistance | taste and odor retention properties | |
|---|---|---|---|---|---|---|---|---|---|
|  | (A) | (B) | 1 | 2 |  |  |  | 1 | 2 |
| C. Ex. 3 | ○ | ○ | Δ | Δ | Δ | Δ | Δ | Δ | X |
| Ex. 5 | ○ | ○ | ○ | ○ | ○ | ○ | ○ | ⊚ | ○ |
| Ex. 6 | ○ | ○ | ○ | ○ | ○ | ○ | ○ | ⊚ | ○ |
| Ex. 7 | ○ | ○ | ○ | ○ | ○ | ○ | ○ | ⊚ | ○ |
| Ex. 8 | ○ | ○ | ○ | ○ | ○ | ○ | ○ | ⊚ | ○ |
| C. Ex. 4 | ○ | ○ | ○ | Δ | ○ | ○ | ○ | ○ | Δ |
| C. Ex. 5 | ○ | ○ | ○ | Δ | Δ | ○ | ○ | ○ | Δ |
| C. Ex. 6 | ○ | ○ | ○ | Δ | ○ | ○ | ○ | ○ | Δ |
| C. Ex. 7 | ○ | ○ | ○ | Δ | Δ | ○ | ○ | ○ | Δ |
| Ex. 9 | ○ | ○ | ○ | ○ | ○ | ○ | ○ | ⊚ | ○ |

C. Ex.: Comparative Example
Ex.: Example

Examples 10 to 13

Copolyethylene terephthalate (containing 0.1 wt % of porous silica having an average particle diameter of 0.7 μm, a pore volume of 1.5 ml/g, a specific surface area of 200 m²/g and a compressive resistance of 20 MPa) was obtained by using acid components, diethylene glycol, glass transition point (Tg), melting point (Tm), alkali metal compound, polycondensation catalyst and phosphorus compound shown in Table 5, dried, melt extruded at 280° C. and quench solidified to give an unstretched film. Thereafter, the unstretched film was stretched to 3.0 times in a longitudinal direction at 110° C. and to 3.0 times in a transverse direction at 120° C., and heat set at 180° C. to give a biaxially oriented film having a thickness of 25 μm. The surface roughness of this film was 15 nm. The evaluation results are as shown in Table 6. Cans obtained by using the films of the present invention were excellent in resistance to heat embrittlement, retort resistance and impact resistance and particularly excellent in odor retention properties and high-level deep drawability.

TABLE 5

|  | dicarboxylic acid components (molar ratio) | | DEG component | polycondensation catalyst | Tg | Tm | amounts of alkali metals | M + P | M/P |
|---|---|---|---|---|---|---|---|---|---|
|  | A | B | (mol %) |  | (° C.) | (° C.) | (ppm) | (mmol %) | (mmol %) |
| Ex. 10 | TA(88) | IA(12) | 1.5 | GeO₂(20) | 73 | 228 | 3 | 30 | 2.0 |
| Ex. 11 | TA(88) | IA(12) | 1.5 | GeO₂(30) | 73 | 228 | 3 | 50 | 1.5 |

TABLE 5-continued

| | dicarboxylic acid components (molar ratio) | | DEG component | polycondensation catalyst | Tg | Tm | amounts of alkali metals | M + P | M/P |
|---|---|---|---|---|---|---|---|---|---|
| | A | B | (mol %) | | (° C.) | (° C.) | (ppm) | (mmol %) | (mmol %) |
| Ex. 12 | TA(88) | IA(12) | 1.5 | GeO$_2$(20) | 73 | 228 | 0 | 25 | 4.0 |
| Ex. 13 | TA(88) | IA(12) | 3.0 | GeO$_2$(20) | 71 | 225 | 3 | 30 | 2.0 |

Ex.: Example
*dicarboxylic acid components
TA: terephthalic acid
IA: isophthalic acid
*DEG: diethylene glycol
*GeO$_2$: germanium dioxide
*IV: intrinsic viscosity
*Tg: glass transition temperature
*Tm: melting point
*M: amounts of metal element
*P: amounts of phosphorus element

TABLE 6

| | lamination properties | | deep drawability | | impact resistance | resistance to heat embrittlement | retort resistance | taste and odor retention properties | |
|---|---|---|---|---|---|---|---|---|---|
| | (A) | (B) | 1 | 2 | | | | 1 | 2 |
| Ex. 10 | ○ | ○ | ○ | ○ | ○ | ○ | ○ | ◉ | ○ |
| Ex. 11 | ○ | ○ | ○ | ○ | ○ | ○ | ○ | ◉ | ○ |
| Ex. 12 | ○ | ○ | ○ | ○ | ○ | ○ | ○ | ◉ | ○ |
| Ex. 13 | ○ | ○ | ○ | ○ | ○ | ○ | ○ | ◉ | ○ |

Ex.: Example

Examples 14 to 18

Copolyethylene terephthalate (intrinsic viscosity of 0.70) which contained 12 mol % of isophthalic acid and 1.5 mol % of diethylene glycol as coplymerization components and a lubricant A having an average particle shown in Table 7 (porous silica having a pore volume of 1.5 ml/g, a specific surface area of 200 m$^2$/g and a compressive resistance of 20 MPa) and a lubricant B having an average particle diameter shown in Table 7 (spherical silica having a particle diameter ratio of 1.1) in a ratio shown in Table 7 was dried, melt extruded, and quench solidified to give an unstretched film. Thereafter, this unstretched film was stretched to 3.0 times in a longitudinal direction at 110° C. and to 3.0 times in a transverse direction at 120° C., and heat set at 180° C. to give a biaxially oriented film. The obtained film had a thickness of 25 μm and a surface roughness shown in Table 7.

The evaluation results are as shown in Table 8. Cans obtained by using the films of the present invention were excellent in heat resistance and impact resistance and particularly excellent in odor retention properties and high-level deep drawability.

TABLE 7

| | lubricant A (porous silica) | | lubricant B (spherical silica) | | surface roughness |
|---|---|---|---|---|---|
| | average particle diameter (μm) | content (wt %) | average particle diameter (μm) | content (wt %) | Ra (nm) |
| Ex. 14 | 0.5 | 0.2 | 0.1 | 0.2 | 12 |
| Ex. 15 | 0.7 | 0.1 | 0.1 | 0.15 | 15 |
| Ex. 16 | 0.7 | 0.1 | 0.3 | 0.1 | 18 |
| Ex. 17 | 1.5 | 0.05 | 0.3 | 0.15 | 20 |
| Ex. 18 | 2.0 | 0.02 | 0.3 | 0.1 | 30 |

Ex.: Example

TABLE 8

| | lamination properties | | deep drawability | | impact resistance | resistance to heat embrittlement | retort resistance | taste and odor retention properties | |
|---|---|---|---|---|---|---|---|---|---|
| | (A) | (B) | 1 | 2 | | | | 1 | 2 |
| Ex. 14 | ○ | ○ | ○ | ○ | ○ | ○ | ○ | ⊙ | ○ |
| Ex. 15 | ○ | ○ | ○ | ○ | ○ | ○ | ○ | ⊙ | ○ |
| Ex. 16 | ○ | ○ | ○ | ○ | ○ | ○ | ○ | ⊙ | ○ |
| Ex. 17 | ○ | ○ | ○ | ○ | ○ | ○ | ○ | ⊙ | ○ |
| Ex. 18 | ○ | ○ | ○ | ○ | ○ | ○ | ○ | ⊙ | ○ |

Ex.: Example

Effect of the Invention

The polyester film to be molded and laminated on a metal sheet of the present invention is satisfactory in terms of heat resistance, retort resistance, impact resistance, and taste and odor retention properties and excellent in moldability, particularly excellent in moldability with a higher degree of deep drawability than usual when it is laminated with a metal sheet and subjected to a can making process, for example, deep drawing, to mold a metal can, and is extremely useful as a film to be molded and laminated on a metal container.

What is claimed is:

1. A biaxially oriented polyester film to be molded and laminated on a metal sheet,
   (A) which comprises a copolyester comprising (a) terephthalic acid and isophthalic acid as dicarboxylic acid components, terephthalic acid being contained in an amount of 82 mol % or more and isophthalic acid or a combination of isophthalic acid and other dicarboxylic acid being contained in an amount of 18 mol % or less based on the total of all the dicarboxylic acid components, and (b) ethylene glycol in an amount of 82 to 100 mol % and other diol in an amount of 0 to 18 mol % based on the total of all the diol components as diol components, having (c) a glass transition temperature of 70° C. or higher and lower than 78° C., (d) a melting point of 210 to 250° C., (e) an intrinsic viscosity of 0.50 to 0.80 dl/g, and containing (f) porous particles having an average particle diameter of 0.1 to 2.5 μm, a pore volume of 0.05 to 2.5 ml/g, a specific surface area of 50 to 600 m²/g and a compressive resistance of 1 to 100 MPa; and
   (B) which contains agglomerates of the porous particles having a particle diameter of 20 μm or more at a density of no more than 10/mm².

2. The film of claim 1, wherein the copolyester consists of terephthalic acid and isophthalic acid as the dicarboxylic acid components and ethylene glycol as the diol component.

3. The film of claim 1, wherein all the diol components of the copolyester consist of 95 mol % or more of ethylene glycol and 5 mol % or less of diethylene glycol.

4. The film of claim 1, wherein the copolyester has a terminal carboxyl group concentration of 40 eq./$10^6$ g or less.

5. The film of claim 1, wherein the copolyester has an acetaldehyde content of 15 ppm or less.

6. The film of claim 1, wherein the copolyester is produced in the presence of a germanium compound as a polycondensation catalyst.

7. The film of claim 1, wherein the copolyester contains an alkali metal compound in an amount of no more than 5 ppm in terms of an elemental alkali metal.

8. The film of claim 1, wherein the copolyester is produced in the presence of a metal compound as a catalyst and a phosphorus compound as a stabilizer which satisfy the following expressions (1) and (2):

$$20 \leq M+P \leq 55 \quad (1)$$

$$1 \leq M/P \leq 5 \quad (2)$$

wherein M is the concentration (mmol %) of a metal element contained in the copolyester and P is the concentration (mmol %) of phosphorus element contained in the copolyester.

9. The film of claim 1, wherein the copolyester contains porous particles in an amount of 0.05 to 5.0 wt %.

10. The film of claim 1, wherein the porous particles have hydroxyl groups in an amount of 300 KOHmg/g or less in terms of hydroxyl value on the surface.

11. The film of claim 1, wherein the copolyester further contains inert globular particles which have a particle diameter ratio (long diameter/short diameter) of 1.0 to 1.2 and an average particle of 2.5 μm or less and do not substantially agglomerate.

12. The film of claim 11, wherein the inert globular particles are silica.

13. The film of claim 11, wherein the average particle diameter of the inert globular particles is smaller than the average particle diameter of the porous particles and in the range of 0.05 to 0.8 μm.

14. The film of claim 11, where the amount of the inert globular particles is 0.01 to 1 wt %.

15. The film of claim 1 which has a refractive index in a film thickness direction of 1.500 to 1.540.

16. The film of claim 1 which has a center line average roughness (Ra) on the film plane of 30 nm or less.

17. The film of claim 1 which has a thickness of 6 to 75 μm.

18. The method of using of the film of claim 1 for the production of a laminate by laminating it with a metal sheet.

19. The method of using of claim 18, wherein the laminate is to be deep drawn for can making.

20. A process for producing a copolyester for a biaxially oriented polyester film to be molded and laminated with a metal sheet, which comprises esterifying dicarboxylic acids consisting of terephthalic acid and isophthalic acid and optionally other dicarboxylic acid, and diols consisting of ethylene glycol and optionally other diol; and adding porous particles having an average particle diameter of 0.1 to 2.5 μm, a pore volume of 0.05 to 2.5 ml/g, a specific surface area of 50 to 600 m²/g and a compressive resistance of 1 to 100 MPa to a polycondensation reaction system after the concentration of terminal carboxyl groups of the obtained polycondensate becomes 100 eq./$10^6$ g or less.

* * * * *